Patented Nov. 5, 1935

2,019,627

UNITED STATES PATENT OFFICE 2,019,627

COLORATION OF MATERIALS

Henry Charles Olpin and George Holland Ellis, Spondon, near Derby, England, assignors to Celanese Corporation of America, a corporation of Delaware No Drawing. Application September 21, 1933, Serial No. 690,420. In Great Britain October 1, 1932

16 Claims. (Cl. 8—5)

This invention relates to the coloration of textile materials and more particularly to the production of colorations on materials made of or containing organic derivatives of cellulose.

In the production of colorations and particularly yellow colorations on materials made of or containing cellulose esters or ethers it is sometimes found that the colorations obtained do not combine such a fastness to light and soaping with fastness to volatility as is always desirable.

It has now been found that valuable colorations may be produced, and particularly yellow colorations, on textile materials made of or containing organic derivatives of cellulose with the aid of aromatic compounds containing at least one nitro group and at least one acidyl amino group, and more particularly with the aid of compounds of the above mentioned character wherein a basic amino group or a non-acidylated amino group, e. g. an unsubstituted amino or aliphatically substitute amino group, or other auxochrome is also present. Particularly valuable dyestuffs for the production of colorations in accordance with the present invention are compounds in which the aromatic hydrocarbon nucleus carries as substituents an acidylated amino group, a non-acidylated amino, and a nitro group, with or without other substituents. Compounds in which a nitro group and an amino group are in ortho relationship to each other yield colorations of outstanding fastness. Especial mention may be made of yellow colorations obtainable on cellulose ester and ether materials by means of acidylamino aromatic compounds of simple structure in which a nitro and a non-acidylated amino group are in the ortho position to each other. Examples of suitable compounds for use in accordance with the present invention are the nitro acidyl amino anilines, toluidines and naphthylamines, for instance monoacetyl-mononitro-p-phenylene-diamine or monobenzoyl-mononitro-p-phenylene-diamines, e. g. 1-amino-2-nitro-4-benzoyl-amino or -4-acetyl-amino benzene, mono-p-toluene-sulphon-mono-nitro-p-phenylene-diamine and the corresponding m-phenylene-diamine derivatives, e. g. 1-amino-2-nitro-5-benzoyl-amino or -5-acetyl-amino benzene.

Instead of compounds in which the nitro and acidyl-amino groups are carried by a simple hydrocarbon nucleus, compounds containing more complex aromatic nuclei may be employed in accordance with the present invention. Thus for example, there may be employed nitro anthraquinone derivatives containing acidylamino groups and particularly nitro anthraquinone derivatives containing non-acidylated amino groups in addition to the acidylamino group. Examples of such compounds are the products obtainable by the mono-acidylation of mono- or di-nitro 1:5 or 1:8-diamino anthraquinone. Again, there may be employed compounds in which two aromatic nuclei are linked through carbon, or are linked directly as in the diphenyl series. An example of such a compound is 3-nitro-4-amino-4'-acetyl-amino-diphenyl. There may also be employed compounds containing nuclei which are not wholly of hydrocarbon character. Thus two aromatic nuclei may be united through oxygen, sulphur, —NH—, —CH$_2$—, —CO— or —CO.NH— or through other atoms or groups. Mention may be made of the amides or substituted amides of aromatic acids substituted in the aromatic nucleus by a nitro and an amino group such for example as 3-nitro-4-amino-benzanilide (obtainable from 3-nitro-4-amino-benzoic acid by conversion of the acid into the chloride, followed by amidation). The invention furthermore is not limited to compounds in which nitro groups are the sole chromophores.

The acidyl grouping may be of any desired character. Thus for example it may be aliphatic e. g. an acetyl grouping, or aromatic e. g. benzoyl or phenyl acetic groupings. Similarly it may contain elements other than carbon. For instance it may contain sulphur as for example in the p-toluene-sulphon-mono-nitro-p-phenylene-diamine mentioned above. If desired, the acidyl grouping may itself be substituted e. g. by nitro, amino or other atoms or groupings. Preferably however the acidyl grouping should not contain groups forming salts with alkalies.

The compounds employed in accordance with the present invention may further contain any other desired substituents in addition to the nitro and acidyl amino group. Preferably, they should contain at least one amino group which is not acylated. Thus for example they may contain halogen, alkyl, alkoxyl, or hydroxy groups in addition to the nitro-amino and acidyl amino groups already mentioned.

The dyestuffs employed in the production of the colorations in accordance with the present invention may be prepared in various ways, a method found to give excellent results, especially with the simpler basic nitro acidylamino compounds, being to prepare the nitro diamine and then acidylate, e. g. with the requisite quantity of acid anhydride or acid chloride.

The dyestuffs which for the coloration of cellulose ester and ether materials are preferably unsulphonated, may be applied to the materials by any desired means. In the absence of substituent groups imparting water solubility, they are in general of insufficient solubility in water to permit application in aqueous solutions. Where desirable or convenient the dyestuff may be applied to cellulose ester or ether materials in the form of dispersions prepared for example with the aid of one or more of the dispersing agents of U. S. Patents Nos. 1,618,413, 1,618,414, 1,694,413, 1,690,481, 1,803,008, 1,840,572 and 1,716,721 and U. S. applications S. Nos. 390,423 filed 4th September, 1929 and 390,424 filed 4th September, 1929, and the compositions containing these dyestuffs and these or other dispersing agents and/or protective colloids and any other ingredients form an important feature of the present invention. If desired, more or less concentrated preparations may be made up containing the dyestuffs, dispersing agents and/or protective colloids and any other desired ingredients, which preparations may be diluted when required for use.

The materials may be colored in accordance with the present invention by any desired method, for example by immersion processes or by mechanical impregnation, or by printing, or stencilling. For printing, the dyestuff preparations may be mixed with a thickening agent such for example as gum arabic, dextrin, or the like, and the resultant paste applied by a convenient method of local application, for example by printing with engraved rollers or through stencils, and the prints afterwards dried, steamed and aged and finished as desired or requisite.

The following examples illustrate the invention without being in any way limitative:—

Example 1

2 kilos of a 10% aqueous suspension of finely divided 1-amino-2-nitro-5-benzoylamino-benzene are dispersed by boiling with 1 kilo of Turkey red oil (50%) and diluted with boiling 2.5 grams per litre soap solution. The color is then strained into a dyebath containing 300 litres of 0.5 gram per litre soap solution and 10 kilos of cellulose acetate knitted fabric entered into the bath. The temperature is slowly raised to 80° C. and maintained thereat for 1½ hours after which the fabric is lifted, rinsed and dried or otherwise treated as desired or requisite, a greenish-yellow shade of good fastness to volatility and soaping being obtained.

Example 2

The procedure of Example 1 is followed excepting that 1-amino-2-nitro-4-acetylamino-benzene is substituted for 1-amino-2-nitro-5-benzoylamino-benzene. The fabric is dyed in a golden yellow shade of good fastness.

Example 3

The procedure of Example 1 is again followed but 3-nitro-4-amino-4'-acetylamino-diphenyl is substituted for 1-amino-2-nitro-5-benzoylamino-benzene. Bright yellow dyeings of good fastness are obtained.

The dyestuffs may be employed in conjunction with any other dyestuffs or coloring matters or other substances according to the particular effects to be obtained. The invention is of particular value in connection with the coloration of cellulose acetate materials. It may, however, be applied to the treatment of other materials for instance materials made of or containing esters of cellulose other than cellulose acetate, for example cellulose formate, propionate or butyrate, or to the treatment of cellulose ether materials, for example ethyl or benzyl cellulose. Again, materials obtainable by treating cellulose with esterifying or etherifying agents while retaining its fibrous form, for example the product known as immunized cotton obtainable by treating alkalized cellulose with para-toluene sulpho-chloride may also be colored in accordance with the present invention. Further, the invention may be applied to the coloration of mixed materials containing for instance one or more of the foregoing esters or ethers of cellulose in conjunction with other types of fibrous materials, for example artificial fibres such for example as regenerated cellulose fibres or vegetable or animal fibres such for example as cotton, wool or silk. Again, colorations may be produced on other materials than cellulose derivative materials in accordance with the present invention, for example on any of the fibres other than the cellulose derivative fibres mentioned above.

What we claim and desire to secure by Letters Patent is:—

1. Process for the production of colorations on materials comprising cellulose acetate, which comprises applying to the materials an aromatic compound containing as the sole chromophore at least one nuclear nitro group, and also containing a non-acylated non-aromatically substituted amino group in ortho relationship to a nuclear nitro group and also containing at least one amino group acidylated with the acidyl residue of a carboxylic acid.

2. Process for the production of colorations on materials comprising cellulose acetate, which comprises applying to the materials an aromatic compound containing as the sole chromophore at least one nuclear nitro group, and also containing a non-acylated non-aromatically substituted amino group in ortho relationship to a nuclear nitro group and also containing at least one amino group acidylated with the acidyl residue of a sulphonic acid.

3. Process for the production of colorations on materials comprising cellulose acetate, which comprises applying to the materials an aromatic compound containing as sole chromophore at least one nuclear nitro group, an unsubstituted amino group in ortho relationship to a nuclear nitro group and also containing at least one amino group acidylated with the acidyl residue of a carboxylic acid.

4. Process for the production of colorations on materials comprising cellulose acetate, which comprises applying to the materials an aromatic compound containing as sole chromophore at least one nuclear nitro group, and also containing an unsubstituted amino group in ortho relationship to a nuclear nitro group and also containing at least one amino group acidylated with the acidyl residue of the sulphonic acid.

5. Process for the coloration of materials comprising cellulose acetate, which comprises applying to the materials a 1-amino-2-nitro-4-acidyl-amino-benzene.

6. Process for the coloration of materials comprising cellulose acetate, which comprises applying to the materials a 1-amino-2-nitro-5-acidyl-amino-benzene.

7. Process for the coloration of materials comprising cellulose acetate, which comprises applying to the materials 1-amino-2-nitro-4-p-toluene-sulphonylamino-benzene.

8. Textile materials comprising cellulose acetate colored with a 1-amino-2-nitro-4-acidylamino-benzene.

9. Textile materials comprising cellulose acetate colored with a 1-amino-2-nitro-5-acidylamino-benzene.

10. Textile materials comprising cellulose acetate colored with 1-amino-2-nitro-4-p-toluenesulphonylamino-benzene.

11. Process for the coloration of textile materials of an organic derivative of cellulose, which comprises applying to the materials an aromatic compound containing as the sole chromophore at least one nuclear nitro group, said compound containing a non-acylated non-aromatically substituted amino group in ortho relationship to a nuclear nitro group, and also containing at least one amino group acidylated with the acidyl residue of a carboxylic acid.

12. Process for the coloration of textile materials of an organic derivative of cellulose, which comprises applying to the materials an aromatic compound containing as the sole chromophore at least one nuclear nitro group, said compound containing a non-acylated non-aromatically substituted amino group in ortho relationship to a nuclear nitro group, and also containing at least one amino group acidylated with the acidyl residue of a sulphonic acid.

13. Textile materials of an organic derivative of cellulose colored with an aromatic compound containing as the sole chromophore at least one nuclear nitro group, said compound containing a non-acylated non-aromatically substituted amino group in ortho relationship to a nuclear nitro group, and also containing at least one amino group acidylated with the acidyl residue of a carboxylic acid.

14. Textile materials of an organic derivative of cellulose colored with an aromatic compound containing as the sole chromophore at least one nuclear nitro group, said compound containing a non-acylated non-aromatically substituted amino group in ortho relationship to a nuclear nitro group, and also containing at least one amino group acidylated with the acidyl residue of a sulphonic acid.

15. Textile materials of cellulose acetate colored with an aromatic compound containing as the sole chromophore at least one nuclear nitro group, said compound containing a non-acylated non-aromatically substituted amino group in ortho relationship to a nuclear nitro group, and also containing at least one amino group acidylated with the acidyl residue of a carboxylic acid.

16. Textile materials of cellulose acetate colored with an aromatic compound containing as the sole chromophore at least one nuclear nitro group, said compound containing a non-acylated non-aromatically substituted amino group in ortho relationship to a nuclear nitro group, and also containing at least one amino group acidylated with the acidyl residue of a sulphonic acid.

HENRY CHARLES OLPIN.
GEORGE HOLLAND ELLIS.